(12) United States Patent
Sepasi

(10) Patent No.: US 12,012,048 B2
(45) Date of Patent: Jun. 18, 2024

(54) THERMOFORMED ARTICLE WITH CO-INJECTED FEATURES

(71) Applicant: ABC TECHNOLOGIES INC., Toronto (CA)

(72) Inventor: Mosen Sepasi, Mississauga (CA)

(73) Assignee: ABC TECHNOLOGIES INC., Toronto (CA)

( * ) Notice: Subject to any disclaimer, the term of this patent is extended or adjusted under 35 U.S.C. 154(b) by 368 days.

(21) Appl. No.: 17/509,332

(22) Filed: Oct. 25, 2021

(65) Prior Publication Data

US 2022/0040902 A1 Feb. 10, 2022

Related U.S. Application Data

(62) Division of application No. 15/994,791, filed on May 31, 2018, now Pat. No. 11,155,019.

(Continued)

(51) Int. Cl.
| | |
|---|---|
| B60R 13/02 | (2006.01) |
| B29C 51/02 | (2006.01) |
| B29C 51/08 | (2006.01) |
| B29C 51/26 | (2006.01) |
| B29C 51/14 | (2006.01) |

(Continued)

(52) U.S. Cl.
CPC .............. B60R 13/02 (2013.01); B29C 51/02 (2013.01); B29C 51/082 (2013.01); B29C 51/266 (2013.01); B29C 51/145 (2013.01); B29C 2791/001 (2013.01); B29C 2793/009 (2013.01); B29K 2311/10 (2013.01);

(Continued)

(58) Field of Classification Search
CPC ..... B29C 51/02; B29C 51/082; B29C 51/145; B29K 2311/10; B29L 2031/3008; B29L 2031/3014; B29L 2031/302; B29L 2031/3041
USPC ......... 296/39.1, 208, 37.1, 37.8, 146.7, 1.08
See application file for complete search history.

(56) References Cited

U.S. PATENT DOCUMENTS

| | | | |
|---|---|---|---|
| 4,243,456 A | | 1/1981 | Cesano |
| 4,818,462 A | | 4/1989 | Murano |

(Continued)

FOREIGN PATENT DOCUMENTS

| | | | | |
|---|---|---|---|---|
| DE | 102004054228 A1 | | 6/2006 | |
| JP | 2006248504 A | * | 9/2006 | ........... B60R 21/205 |
| JP | 4218794 B2 | * | 2/2009 | |

OTHER PUBLICATIONS

Translation of JP2006-248504 (Year: 2009).*
Translation of JP4218794 (Year: 2009).*

*Primary Examiner* — Dennis H Pedder
(74) *Attorney, Agent, or Firm* — McDonald Hopkins LLC

(57) ABSTRACT

A thermoformed article is disclosed that includes a self-supporting structural base layer, a covering applied to a first side of the base layer, and one or more secondary features co-injected upon a second side of the base layer. The covering and the secondary features of the thermoformed article are applied to the base layer during the same molding operation. Also disclosed is a process for forming a thermoformed article that includes placing a covering in a mold tool as a first layer, placing a self-supporting structural base layer in the mold tooling as a second layer, closing the mold tooling with the covering and base layer, and co-injecting upon a side of the base layer opposite to the covering one or more secondary features.

7 Claims, 18 Drawing Sheets

Related U.S. Application Data

(60) Provisional application No. 62/513,891, filed on Jun. 1, 2017.

(51) Int. Cl.
  *B29K 311/10* (2006.01)
  *B29L 31/30* (2006.01)

(52) U.S. Cl.
  CPC ............... *B29L 2031/3008* (2013.01); *B29L 2031/3014* (2013.01); *B29L 2031/302* (2013.01); *B29L 2031/3041* (2013.01)

(56) References Cited

U.S. PATENT DOCUMENTS

| | | |
|---|---|---|
| 2002/0106952 A1 | 8/2002 | Hashizume et al. |
| 2004/0135394 A1* | 7/2004 | Clauson ............ B60R 13/0206 296/146.7 |
| 2006/0105661 A1 | 5/2006 | Steinbach |
| 2008/0211137 A1* | 9/2008 | Schilles ............ B29C 45/14786 425/457 |
| 2009/0136708 A1 | 5/2009 | Huang et al. |
| 2013/0052412 A1 | 2/2013 | Fox et al. |

* cited by examiner

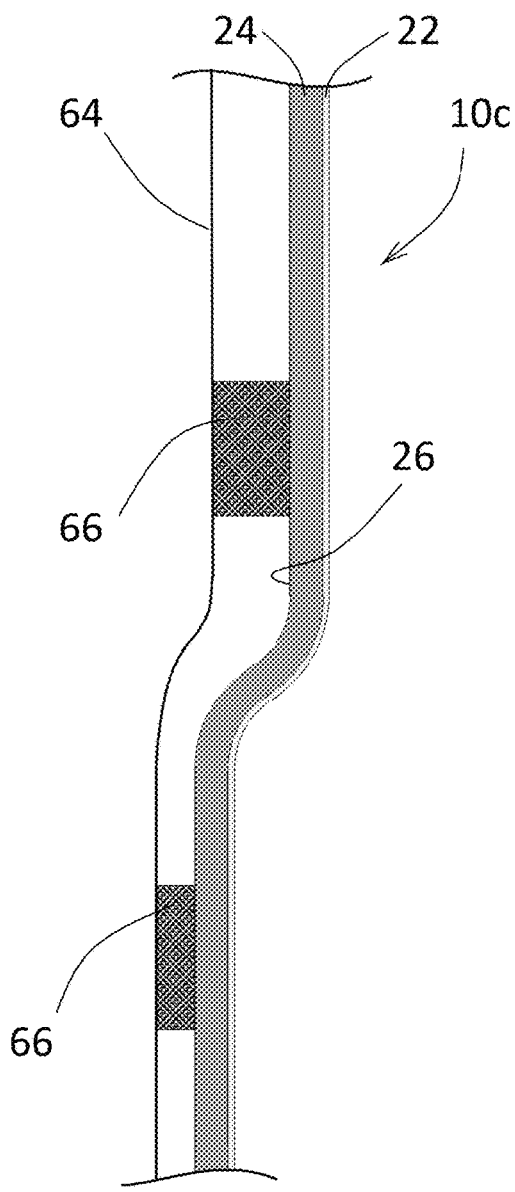 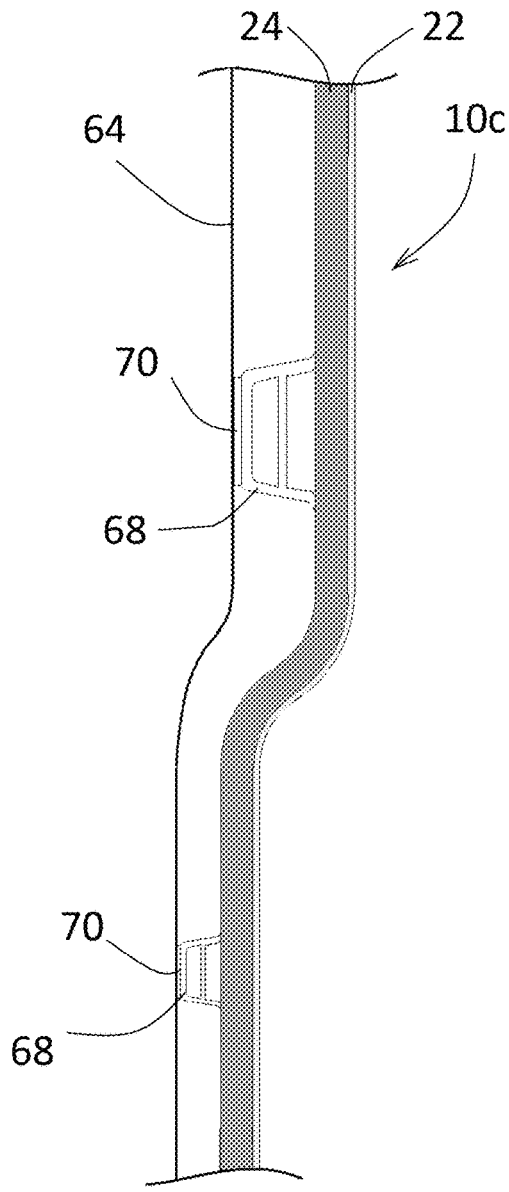
FIG. 5a
FIG. 5b

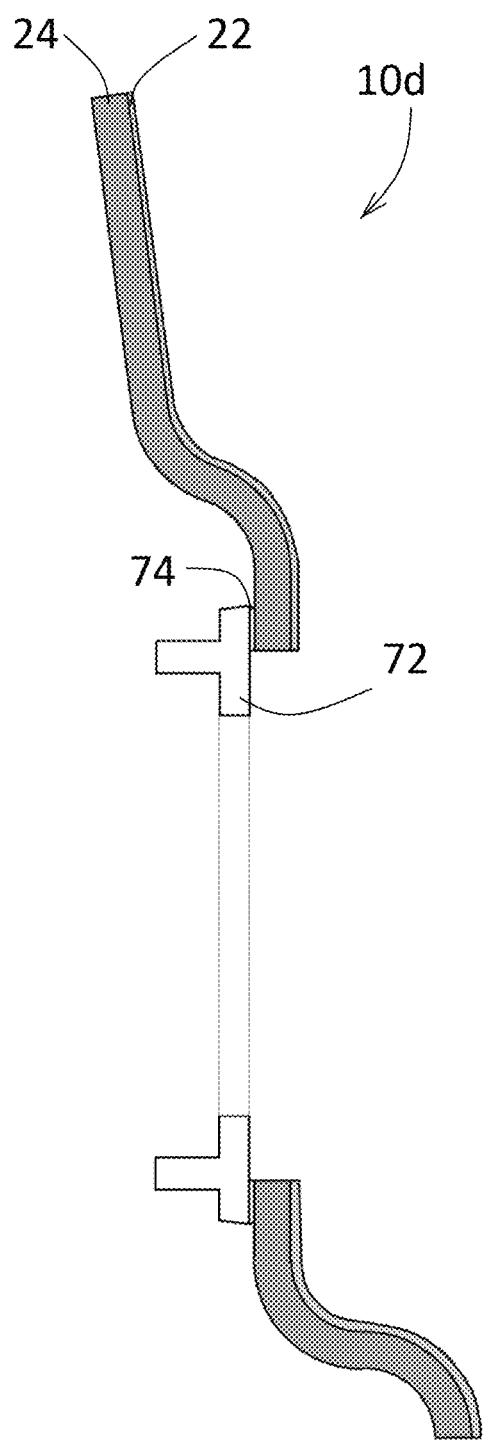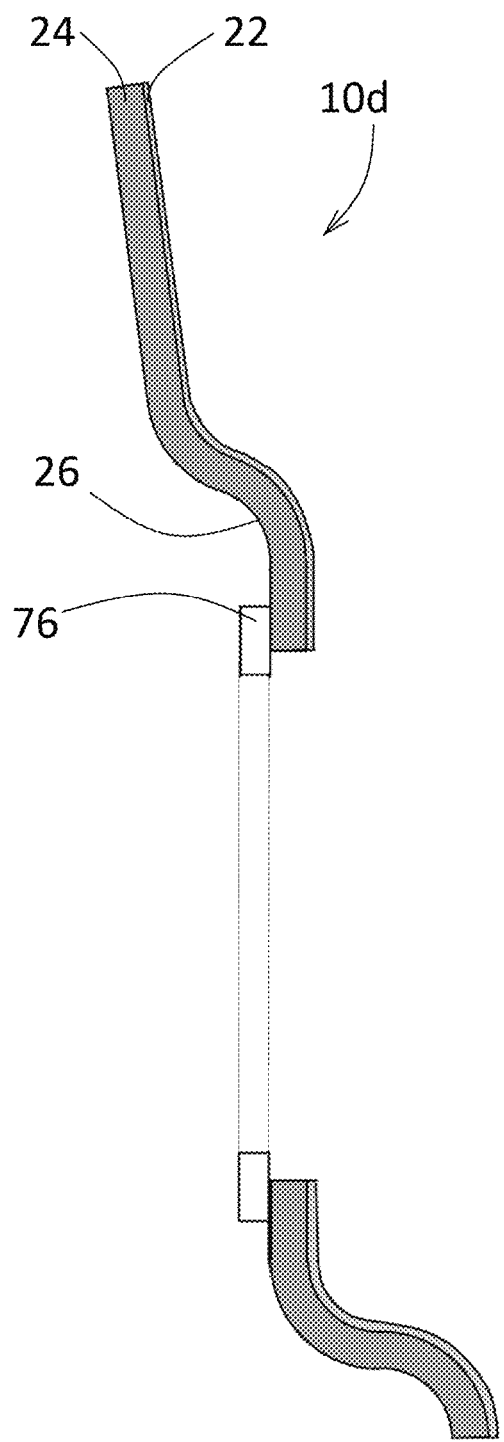
FIG. 6b                    FIG. 6c

THERMOFORMED ARTICLE WITH
CO-INJECTED FEATURES

CROSS-REFERENCE TO RELATED
APPLICATION

The present application is a divisional of prior application Ser. No. 15/994,791, filed May 31, 2018, which claims the benefit of prior U.S. Appl. No. 62/513,891, filed Jun. 1, 2017, the entire contents of which are incorporated by reference herein.

FIELD OF THE INVENTION

The present disclosure pertains to thermoformed articles, and in particular to a thermoformed article having co-injected features.

BACKGROUND

Automotive interior trim panels such as instrument panels, door panels, as well as those found on pillars, in the rear cargo area, and a variety of other interior surfaces have traditionally served to enhance the interior aesthetics of the vehicle. The automotive industry is quickly evolving, and the refinement of the automotive interior environment is an ever-growing indicator of overall quality that consumers are increasingly attuned to. As such, there is a continual drive to elevate the quality of the interior environment, in particular as automobiles are increasingly being viewed as an extension of living space. This is especially important as the industry moves towards autonomous vehicles, as the perception of the vehicle interior will gradually shift away from one of utility, to one of recreation and relaxation.

Accordingly, improvements on the interior aesthetics of the vehicle are continually being sought. While current approaches to the construction and assembly of the interior environment are well established and provide for good fit and finish, the requirement to produce and assemble a variety of separately formed components increases the complexity of the process, along with the potential for part failure and a loss of aesthetic integrity in the interior environment.

SUMMARY

According to an aspect of the disclosure, provided is a thermoformed article. The thermoformed article comprises a self-supporting structural base layer, a covering applied to a first side of the base layer, and one or more secondary features co-injected upon a second side of the base layer. The covering and the secondary features are applied to the base layer during the same molding operation.

According to another aspect of the disclosure, provided is a process for forming a thermoformed article. The process comprises placing a covering in a mold tool as a first layer, placing a self-supporting structural base layer in the mold tooling as a second layer, closing the mold tooling, and co-injecting upon a side of the base layer opposite to the covering one or more secondary features.

BRIEF DESCRIPTION OF THE DRAWINGS

The foregoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

FIG. 5a depicts a known manner of using spacers and supports to facilitate mounting an interior panel to a vehicle structure.

FIG. 5b provides a third exemplary implementation of the disclosed technology, as applied to spacers and supports to facilitate mounting the interior panel to the vehicle structure.

FIGS. 6a and 6c provide a fourth exemplary implementation of the disclosed technology, as applied to frames used for mounting access doors.

FIG. 6b depicts a known manner of using a frame for mounting an access door.

DETAILED DESCRIPTION

Specific embodiments of the present disclosure will now be described with reference to the Figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, brief summary or the following detailed description.

Figure 1:
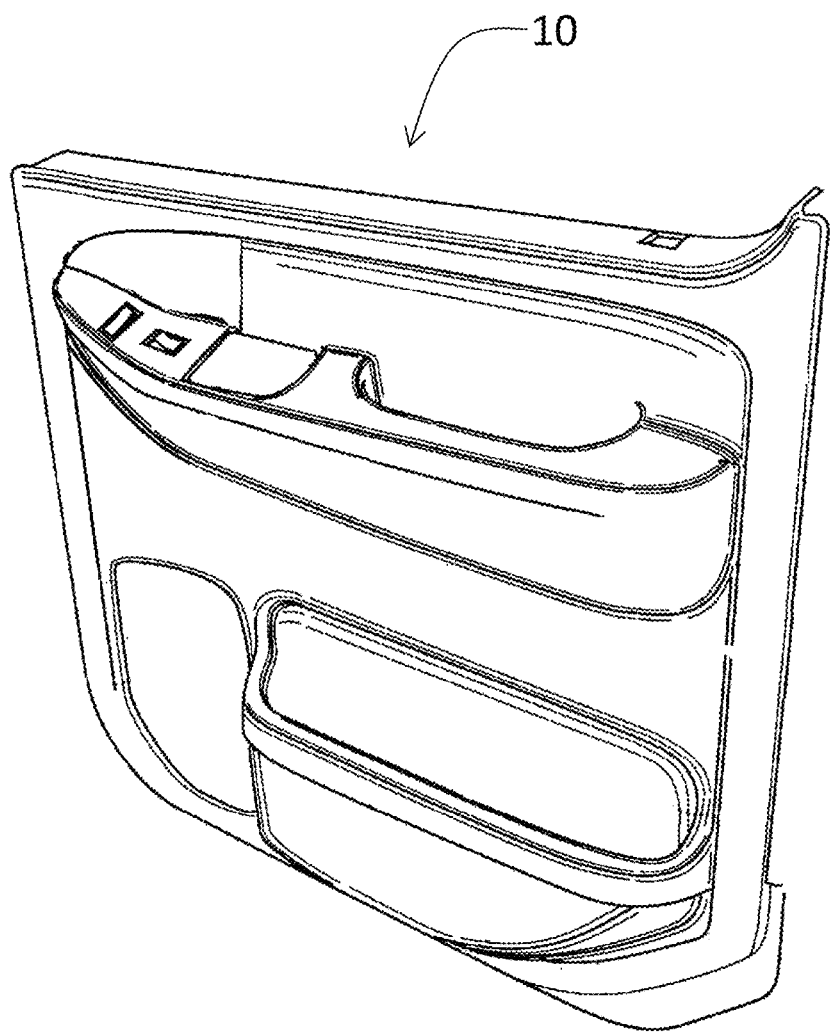
FIG. 1 is a perspective view of an exemplary interior panel (door panel) configured to be mounted to an interior side of a vehicle door.

Turning now to FIG. 1, shown is a thermoformed automotive door panel configured to be mounted to the interior side of a vehicle door. As the technology disclosed herein may be applied to a wide range of interior panels in a vehicle, the door panel (and other interior panels discussed for the purpose of exemplifying the technology) are generally referred to herein as an interior panel 10. As shown in the partial perspective view of FIG. 2a, the interior panel 10 presents a first side, herein referred to as an A-side 20, which is generally covered with a wear-resistant and/or aesthetically pleasing covering 22. The covering 22 may be made of a natural or synthetic material. For example, the covering 22 may be a textile fabric such as a woven or non-woven carpet. Other coverings 22, including, but not limited to vinyl, leather and another decorative applique may also be implemented.

The interior panel 10 includes a base 24 that generally forms a self-supporting structural layer of the door panel. The base 24 is formed of a fiber-reinforced thermoplastic material. For example, the base 24 may be formed from a woven or non-woven natural-fiber mat that is impregnated and consolidated with a suitable thermoplastic material such as polypropylene. Examples of suitable natural fiber include, but are not limited to hemp, jute, sisal, flax and kenaf. While polypropylene as a matrix is exemplified herein, other thermoplastic materials may be suitably implemented depending on the intended application. For clarity, the term 'consolidation' as used herein refers to the process of subjecting a resin impregnated fibrous mat to heat and pressure (i.e. through a series of heated compression rollers or a mold press), to sufficiently soften the thermoplastic resin, enabling it to wet out and fully encapsulate the reinforcing fibers.

Figure 2A:
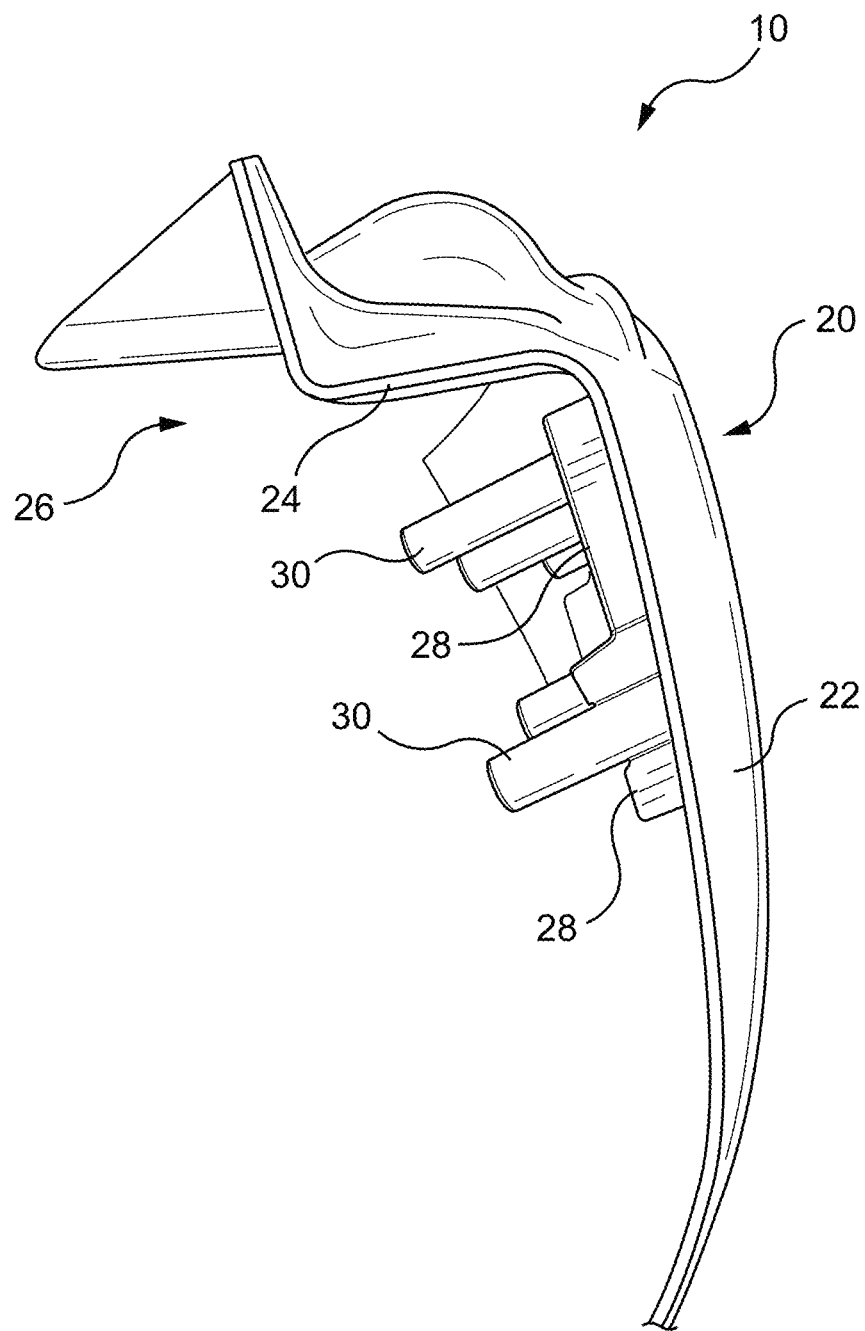
FIG. 2a is a partial perspective view of generally the A-side of the interior panel of FIG. 1.
Figure 2B:
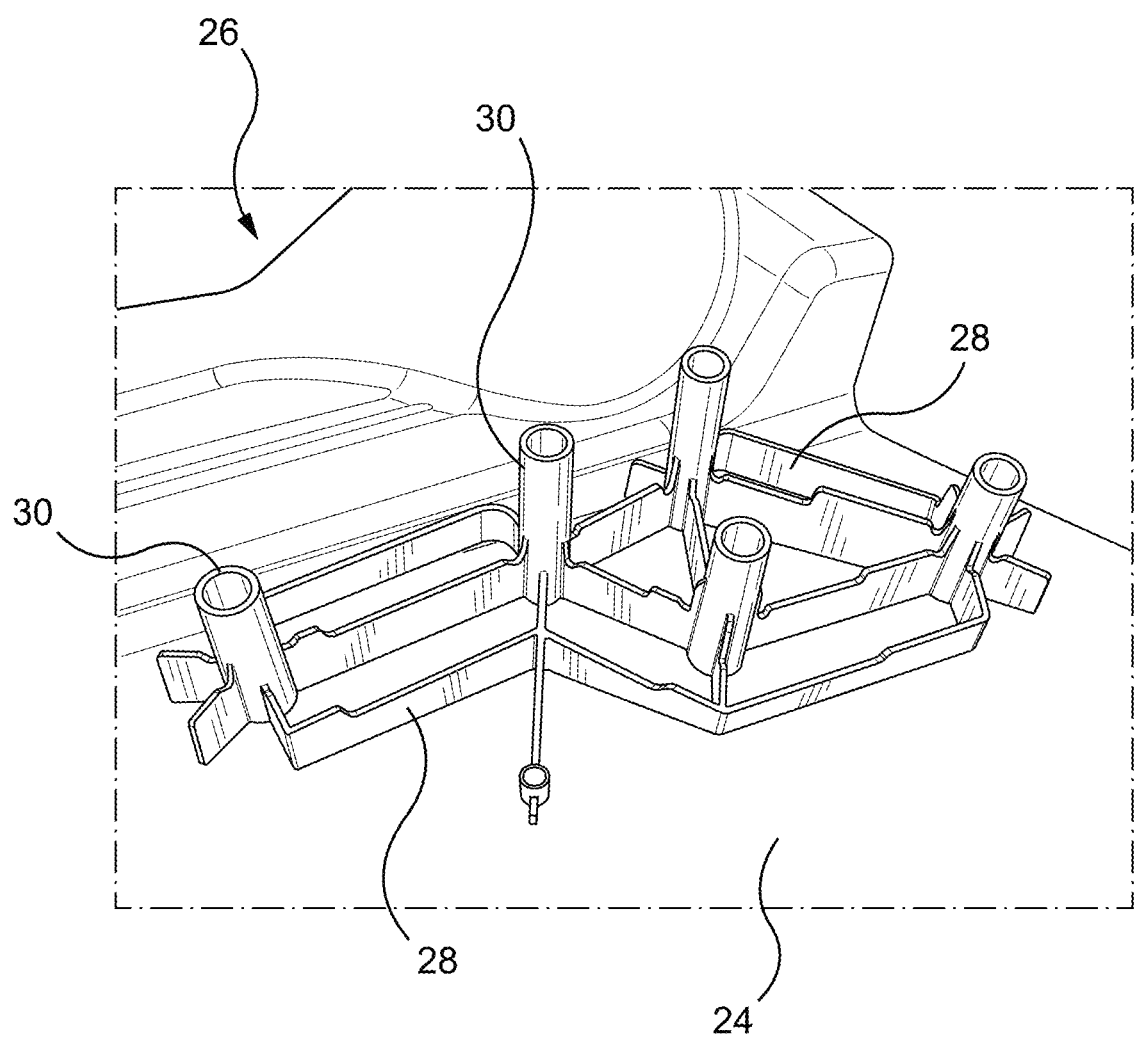
FIG. 2b is a partial perspective view of the interior panel of FIG. 1, showing more clearly some of the secondary features provided on the B-side.

Continuing with FIG. 2a, a second side, herein referred to as a B-side 26, of the interior panel 10 is also shown. The B-side 26 is generally not exposed to an occupant of the vehicle and therefore does not present a covering 22 as would typically be provided on the A-side 20. The B-side 26 is generally provided with various secondary features including, but not limited to spacers and attachment hardware enabling the interior panel 10 to be securely attached to a supporting structure (i.e. body-in-white, vehicle door frame, etc.). In the embodiment shown, the B-side 26 presents reinforcement ribs 28 and fastener bosses 30. The placement of the reinforcement ribs 28, the fastener bosses 30, or any other feature on the B-side 26 of the interior panel 10 is determined by the intended application and needs. The features provided on the B-side 26 of the interior panel 10 are injection molded onto the base 24. For clarity, FIG. 2b provides a different view of a portion of the B-side 26 of the interior panel 10 of FIG. 2a, showing the reinforcement ribs 28 and fastener bosses 30 co-injected directly upon the base 24.

The injected molded features provided on the B-side 26 of the interior panel 10 may take on a variety of configurations. Examples of features that may be provided include, but are not limited to, reinforcement ribs, fastener bosses, fasteners (i.e. clips), fastener towers (i.e. clip towers), stand-offs, spacers, frame members (i.e. for supporting access doors).

Figure 3A:
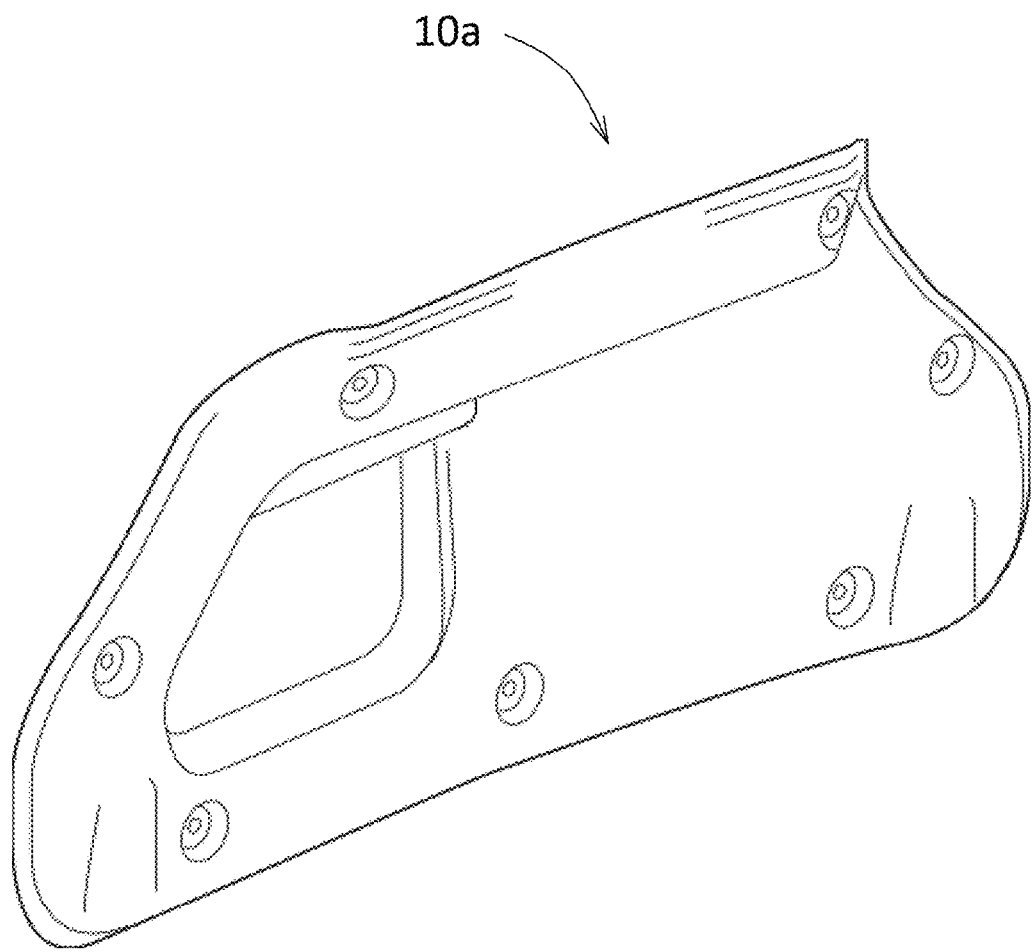
FIGS. 3a and 3c provide a first exemplary implementation of the disclosed technology, as applied to fasteners, in particular automotive fasteners.
Figure 3B:
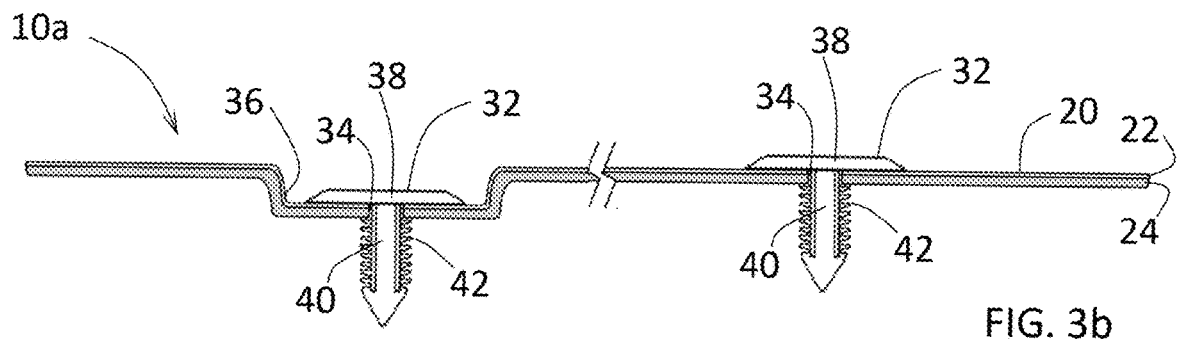
FIG. 3b depicts a known manner of using fasteners, in particular automotive fasteners.
Figure 3C:
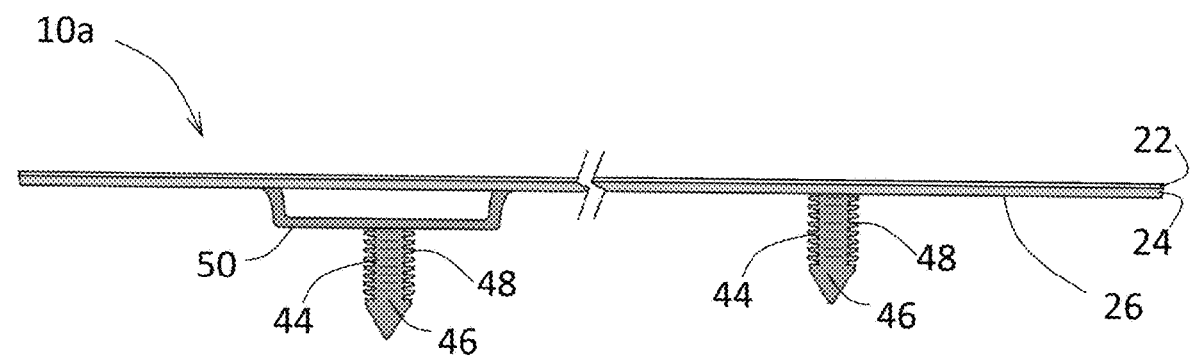

Having regard to FIG. 3a, shown is an interior panel 10a which requires the use of a fastening system to mount the panel where intended within the interior area of the vehicle. The known method of mounting such a panel is presented in FIG. 3b, where one or more separately-formed automotive fasteners 32 (generally referred to as a Christmas tree fastener) are used to fasten the panel to an intended supporting structure (i.e. the vehicle or door frame). In general, the interior panel 10a provides one or more fastening apertures 34 that each receive a corresponding automotive fastener 32. In some embodiments, the fastening apertures 34 are located in recesses 36, as shown in FIG. 3a. The automotive fastener 32 is pressed onto the A-side 20 of the interior panel 10 through the fastening apertures 34, to engage both the interior panel 10 and the supporting structure behind it (not shown). The automotive fastener 32 includes a head 38 and an engagement shaft 40 having a plurality of capture elements 42 configured to insert into a receiving aperture on the supporting structure (not shown) and therein lock the automotive fastener 32 relative thereto. As shown, the head 38 of the automotive fastener 32 generally remains visible, and therein potentially detracts from the overall aesthetics of the vehicle interior. The method according to the present disclosure is presented in FIG. 3c, wherein one or more fasteners 44 are co-injected upon the B-side 26, therein presenting as an integral component of the interior panel 10. Similar to the aforementioned automotive fasteners 32, the integral fasteners 44 include an engagement shaft 46 having a plurality of capture elements 48, therein performing in a similar manner. The fasteners 44 may be directly applied to the B-side 26 of the interior panel 10 or may be formed including a tower 50 to provide a required spacing and/or to eliminate the need for a fastener recess 36 where used. As the fasteners 44 are integrally formed with the B-side 26 of the interior panel 10, the A-side 20 of the panel 10 does not present any visible fastener heads and/or recesses, thus improving upon the aesthetic appearance of the interior space.

Figure 4A:
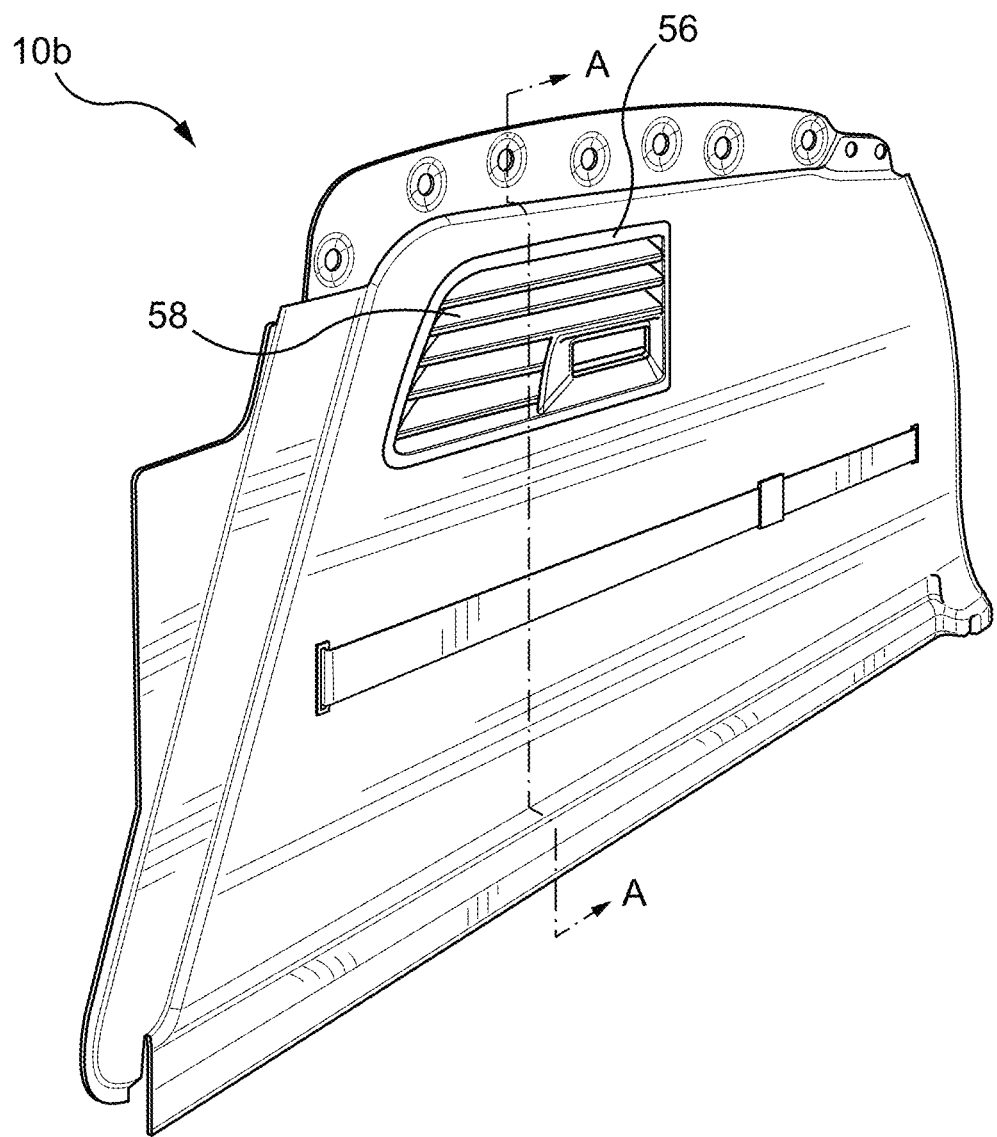
FIGS. 4a and 4c provide a second exemplary implementation of the disclosed technology, as applied to grills/vents.
Figure 4B:
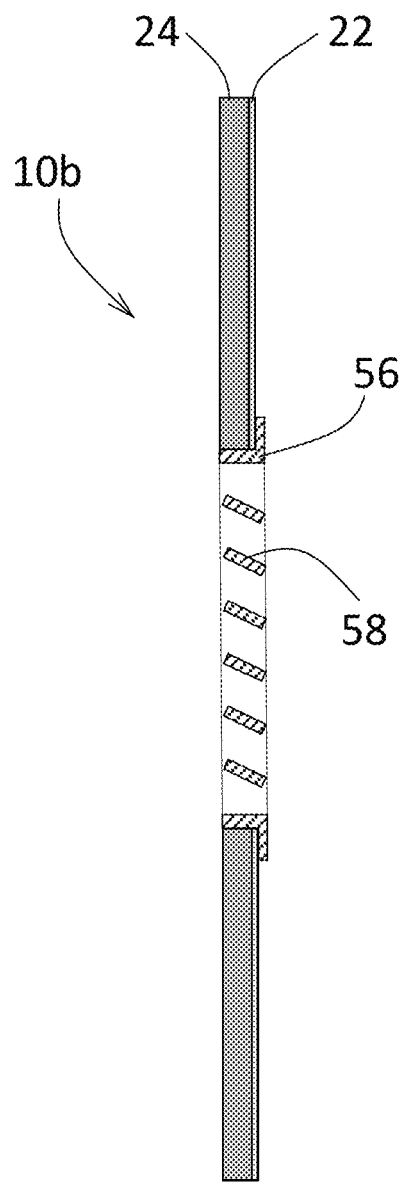
FIG. 4b depicts a known manner of using a grill/vent.
Figure 4C:
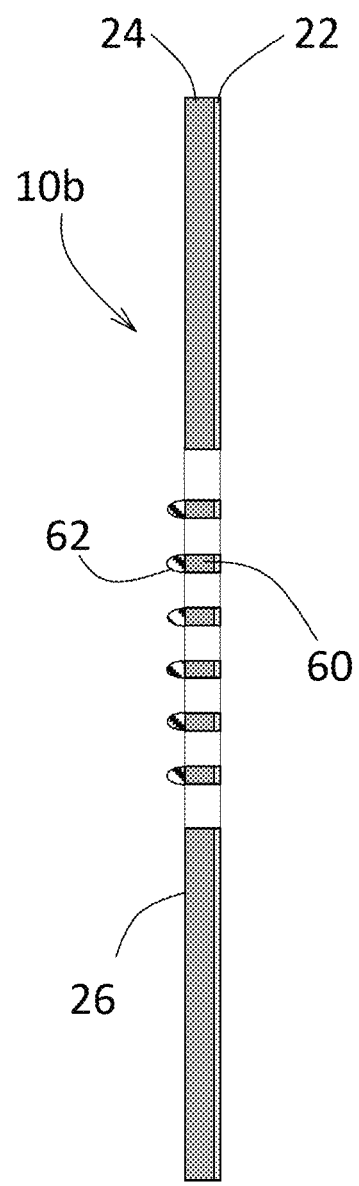

Having regard to FIG. 4a, shown is an interior panel 10b that incorporates a grill 56 having a plurality of vanes 58. The known method of providing a grill 56 is shown in FIG. 4b, wherein the grill 56 is separately formed, for example by a separate injection molding process, and thereafter attached to an opening in the interior panel 10b using a suitable fastener, adhesive or welding process. The method according to the present disclosure is presented in FIG. 4c, wherein vanes 60 are integrally formed into the interior panel 10b. The vanes 60 are formed from the base 24 and covering 22 and are reinforced by co-injecting upon the B-side 26 reinforcement ribs 62. In this application of the technology, the mold tooling may be configured to selectively remove (i.e. pinch-off) portions of the base 24 and covering 22 from between the vanes 60 during the molding operation.

Having regard to FIG. 5a, shown is an interior panel 10c which requires the use of suitable spacers to support the mounting of the panel 10c to a supporting structure 64. As shown, the known method of providing the required spacing and support involves the use of foam blocks 66. The foam blocks 66 are cut and attached to the B-side 26 of the panel 10 using a suitable fastener, adhesive or welding process. The foam blocks 66 support the panel 10 and reduce the extent of squeak and rattle (S&R) arising from the assembly. The method according to the present disclosure is shown in FIG. 5b, wherein the proper spacing and support for mounting the panel 10c is provided by way of stand-offs 68 co-injected upon the B-side 26 at select locations. As such, the stand-offs 68 are formed as an integral component of the interior panel 10. In this way, the provision of the required spacers and supports (by way of the stand-offs 46) is accurate and consistent across the production line. To enhance acoustical performance, the stand-off 68 may be provided with an anti-S&R tape 70.

Figure 6A:
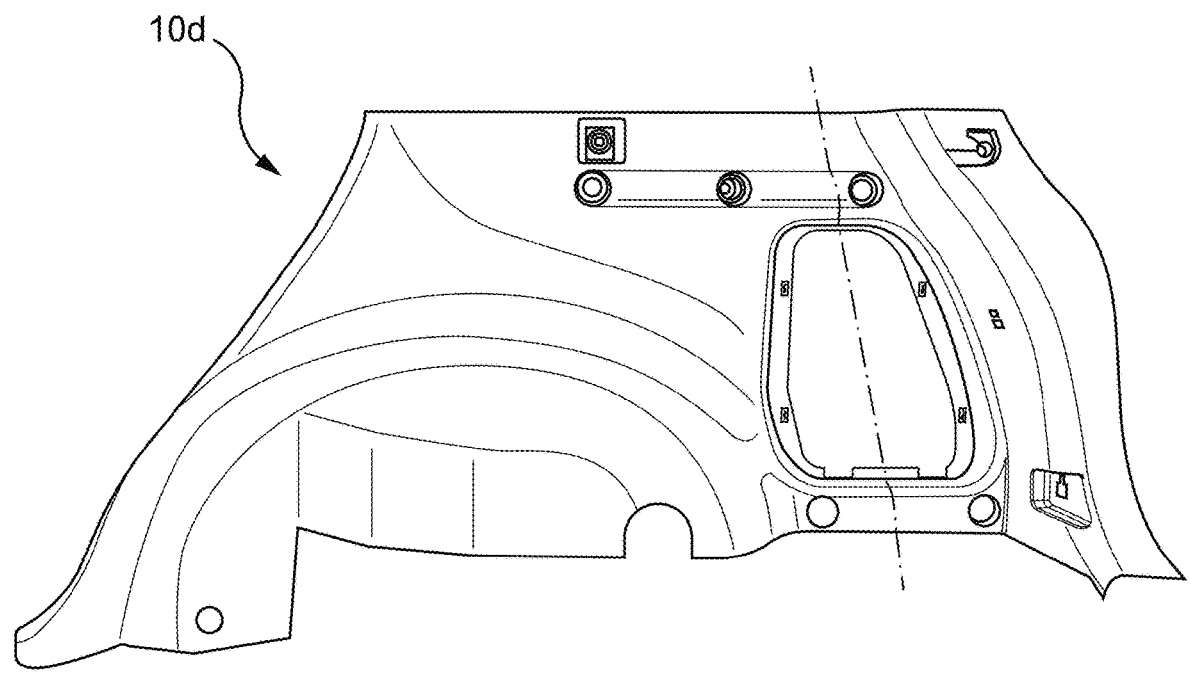
Figure 7:
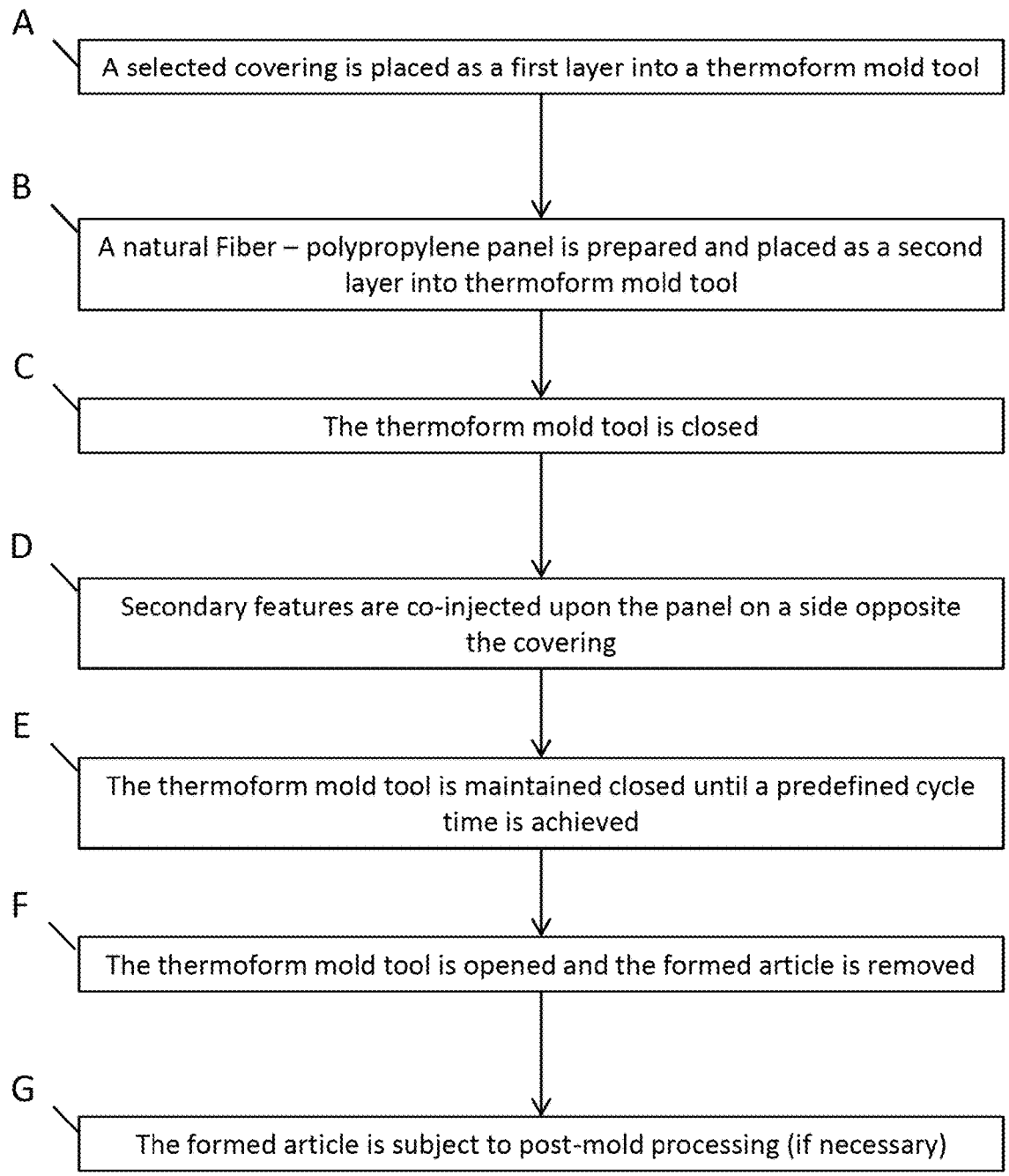
FIGS. 7 and 8a-8c depict an embodiment of a combined thermoforming/injection molding process.

Having regard to FIG. 6a, shown is an interior panel 10d that incorporates a frame 72 for mounting an access door, for example as may be provided for a storage compartment. The known method of providing a frame 72 is shown in FIG. 6b, wherein the frame 72 is separately formed, for example by a separate injection molding process, and thereafter attached to an opening in the interior panel 10 using a suitable fastener, adhesive 74 or welding process. The method according to the present disclosure (PANEL B) has a frame 76 for the access door co-injected upon the B-side 26, therein presenting as an integral component of the interior panel 10.

Figure 8A:
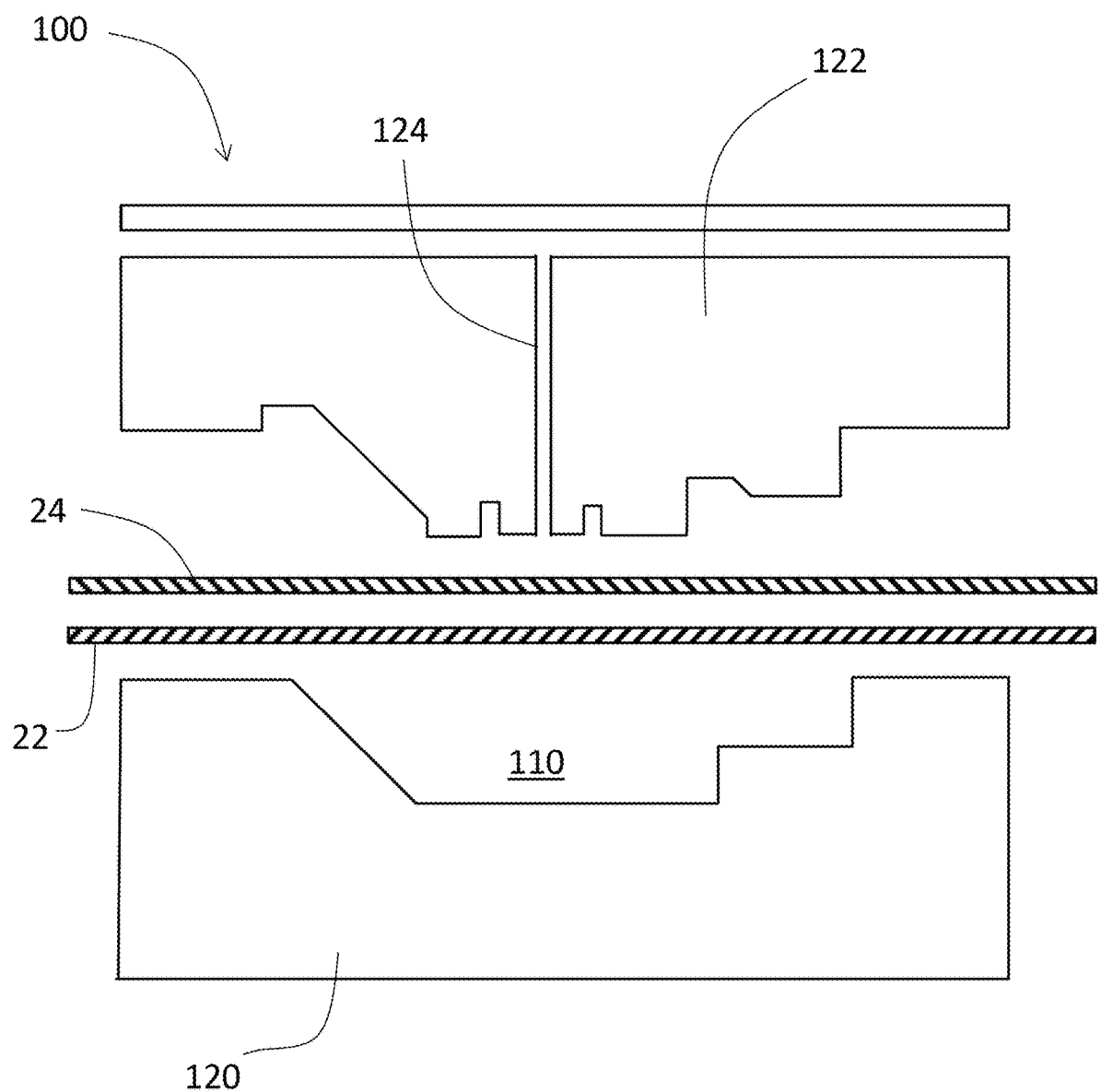

Turning now to FIGS. 7 and 8a-8c, shown is a first combined thermoforming/injection molding process. The process generally proceeds as follows:

STEP 1 (at A; FIG. 8a)—A selected covering 22 is placed as a first layer into a thermoforming mold tool 100. In particular, the covering 22 is placed in a region of a cavity 110 of the thermoforming mold tool 100 that corresponds to the A-side of the article.

STEP 2 (at B; FIG. 8*a*)—A natural fiber—polypropylene (NF-PP) base 24 is prepared and placed as a second layer into the thermoforming mold tool 100. The NF-PP base 24 is inserted into the thermoforming mold tool 100 once it has been consolidated, as previously mentioned. As the NF-PP base can be commercially purchased unconsolidated, it will be appreciated that an additional step of consolidating the base prior to entry into the thermoforming mold tool 100 may be performed. The NF-PP base 24 is placed in a region of the cavity 110 of the thermoforming mold tool 100 that corresponds to the B-side of the article.

Figure 8B:
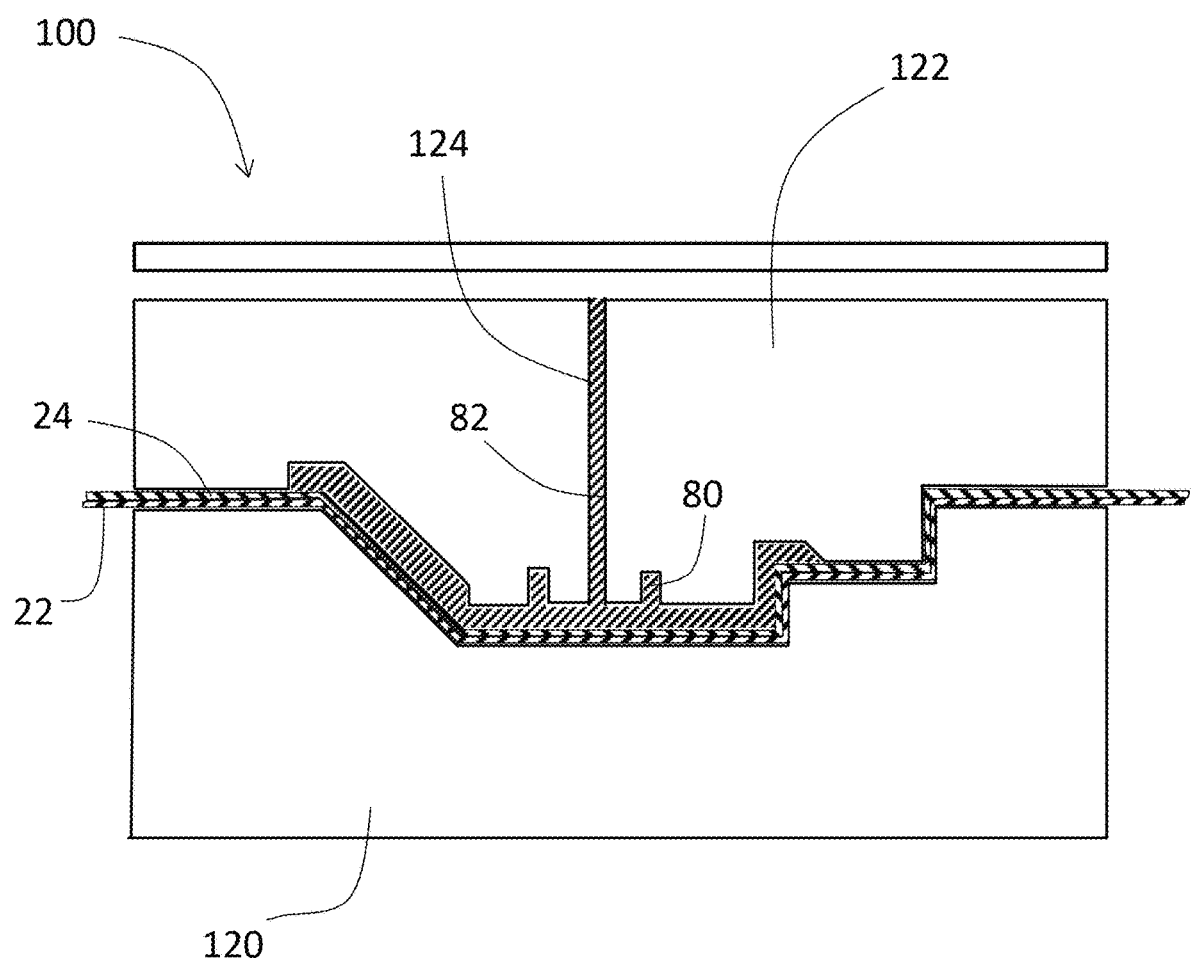

STEP 3 (at C; FIG. 8*b*)—The thermoform mold tool 100 is closed. The thermoform mold tool 100 will generally comprise a first mold member 120 and a second mold member 122 that together define the cavity 110. It will be appreciated that in certain arrangements, the mold tool 100 may comprise additional mold members.

STEP 4 (at D; FIG. 8*b*)—Secondary features (generally noted as 80) are now co-injected upon the B-side of the layered construct. The secondary features are formed of a compatible thermoplastic. In the present embodiment, the thermoplastic is a polypropylene that is co-injected via a suitable runner 124 provided on the second mold member 122. As shown, the co-injected polypropylene material, and hence the formed secondary structure, is applied to the B-side of the article. By virtue of the high-pressures required for the injection-molding step of the process, the covering 22, NF-PP base 24, and the co-injected polypropylene are urged into contact, therein ensuring a secure bond between these different components of the finished article.

STEP 5 (at E; FIG. 8*b*)—The thermoform mold tool 100 is maintained closed until a predefined cycle time is achieved. The cycle time will be dependent upon the article being formed, as well as the heating/cooling profile of the mold tool being used.

Figure 8C:
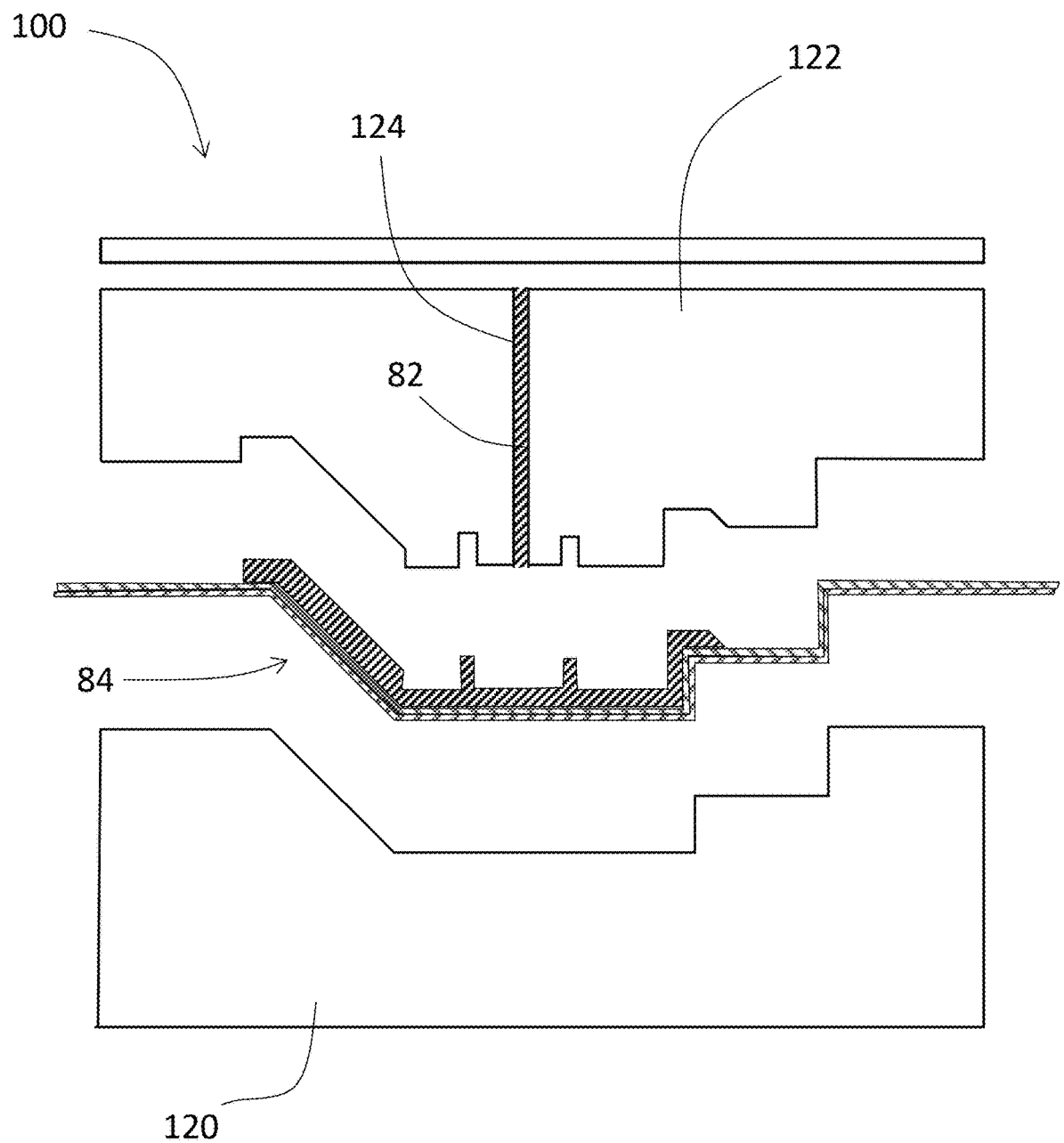
Figure 9:
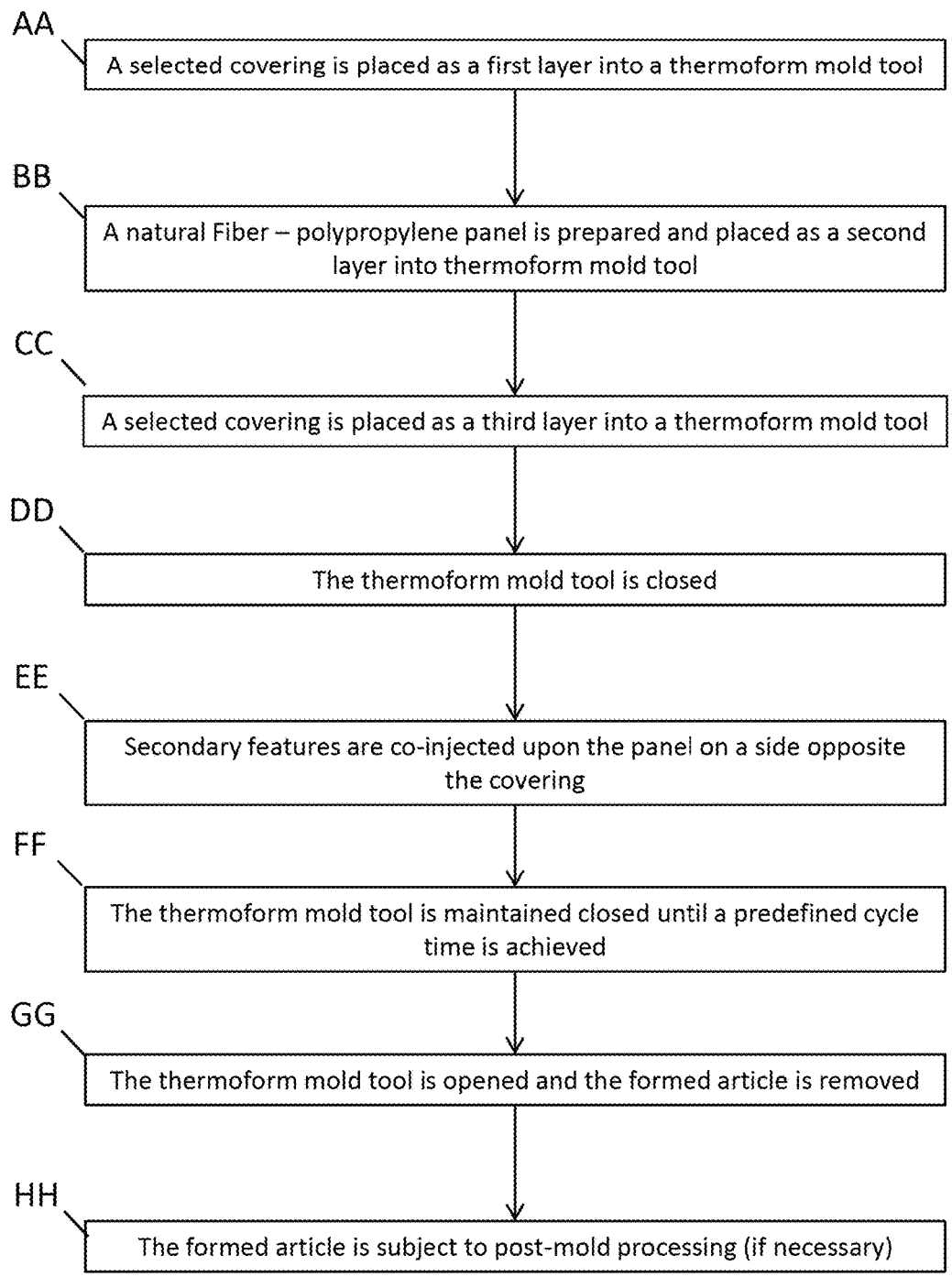
FIGS. 9 and 10a-10c depict another embodiment of a combined thermoforming/injection molding process.

STEP 6 (at F; FIG. 8*c*)—The thermoform mold tool 100 is opened and the formed article 84 is removed. The mold tool 100 may incorporate ejector pins or other mechanisms to facilitate ejection of the molded article (not shown).

STEP 7 (at G; not shown in Figures)—The formed article 84 is subject to post-mold processing, if necessary. Post mold processing may involve the removal of flash or other waste elements from the finished article 84.

Figure 10A:
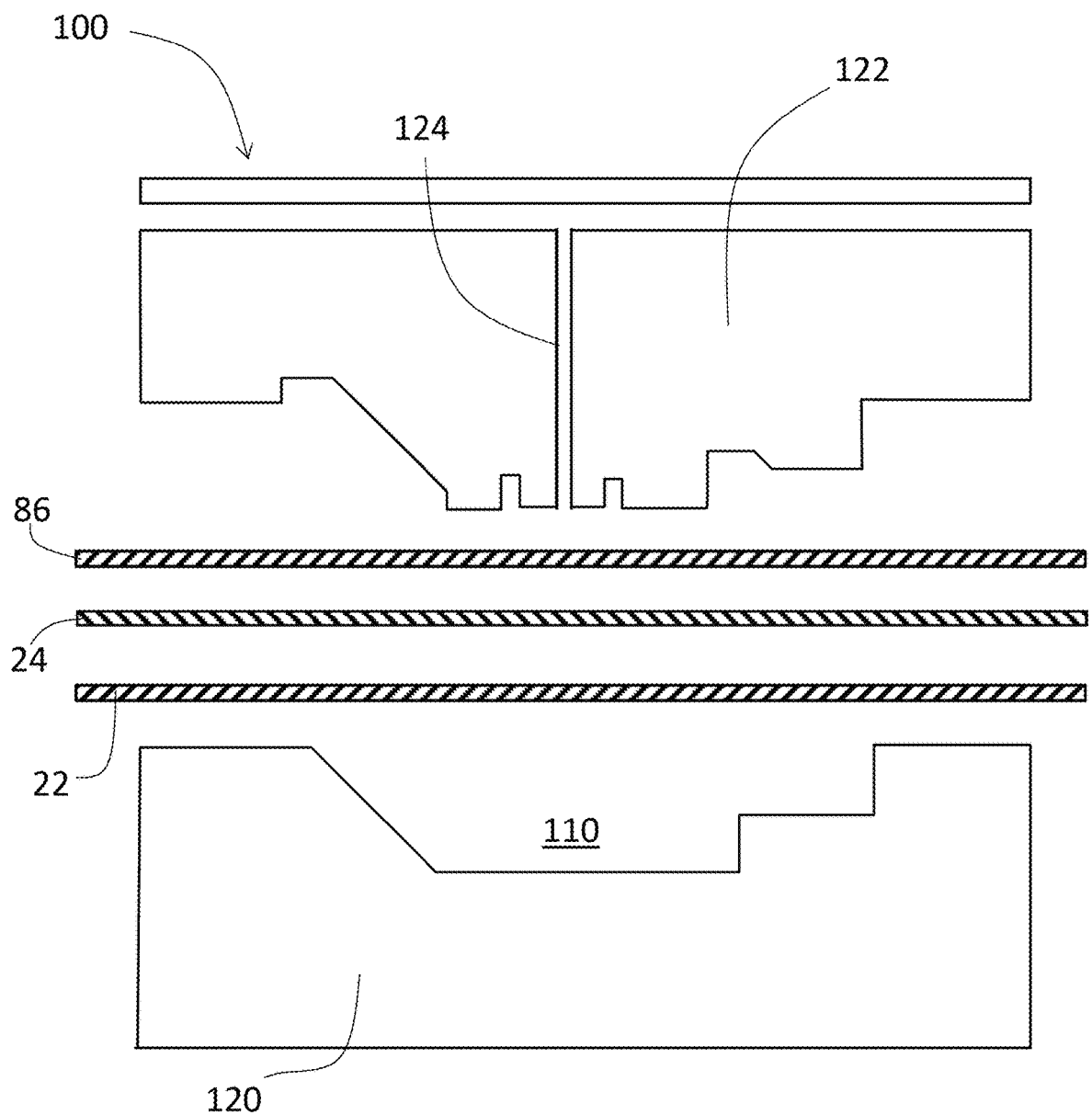

Turning now to FIGS. 9 and 10*a*-10*c*, shown is a second combined thermoforming/injection molding process. The process that follows includes an additional step of placing a second covering layer 86 on the opposite side of the NF-PP base 24, therein providing the B-side with a more aesthetically pleasing appearance. For example, the second covering layer 86 may be similar to the first covering layer 22, or may be a thinner covering layer, for example a scrim. The process generally proceeds as follows:

STEP 1 (at AA; FIG. 10*a*)—A selected covering 22 is placed as a first layer into a thermoforming mold tool 100. In particular, the covering 22 is placed in a region of a cavity 110 of the thermoforming mold tool 100 that corresponds to the A-side of the article.

STEP 2 (at BB; FIG. 10*a*)—A natural fiber—polypropylene (NF-PP) base 24 is prepared and placed as a second layer into the thermoforming mold tool 100. The NF-PP base 24 is inserted into the thermoforming mold tool 100 once it has been consolidated, as previously mentioned. As the NF-PP base 24 can be commercially purchased unconsolidated, it will be appreciated that an additional step of consolidating the panel prior to entry into the thermoforming mold tool 100 may be performed.

STEP 3 (at CC; FIG. 10*a*)—A selected second covering 86 is placed as a third layer into the thermoforming mold tool 100. In particular, the second covering 86 is placed in a region of the cavity 110 of the thermoforming mold tool 100 that corresponds to the B-side of the article.

Figure 10B:
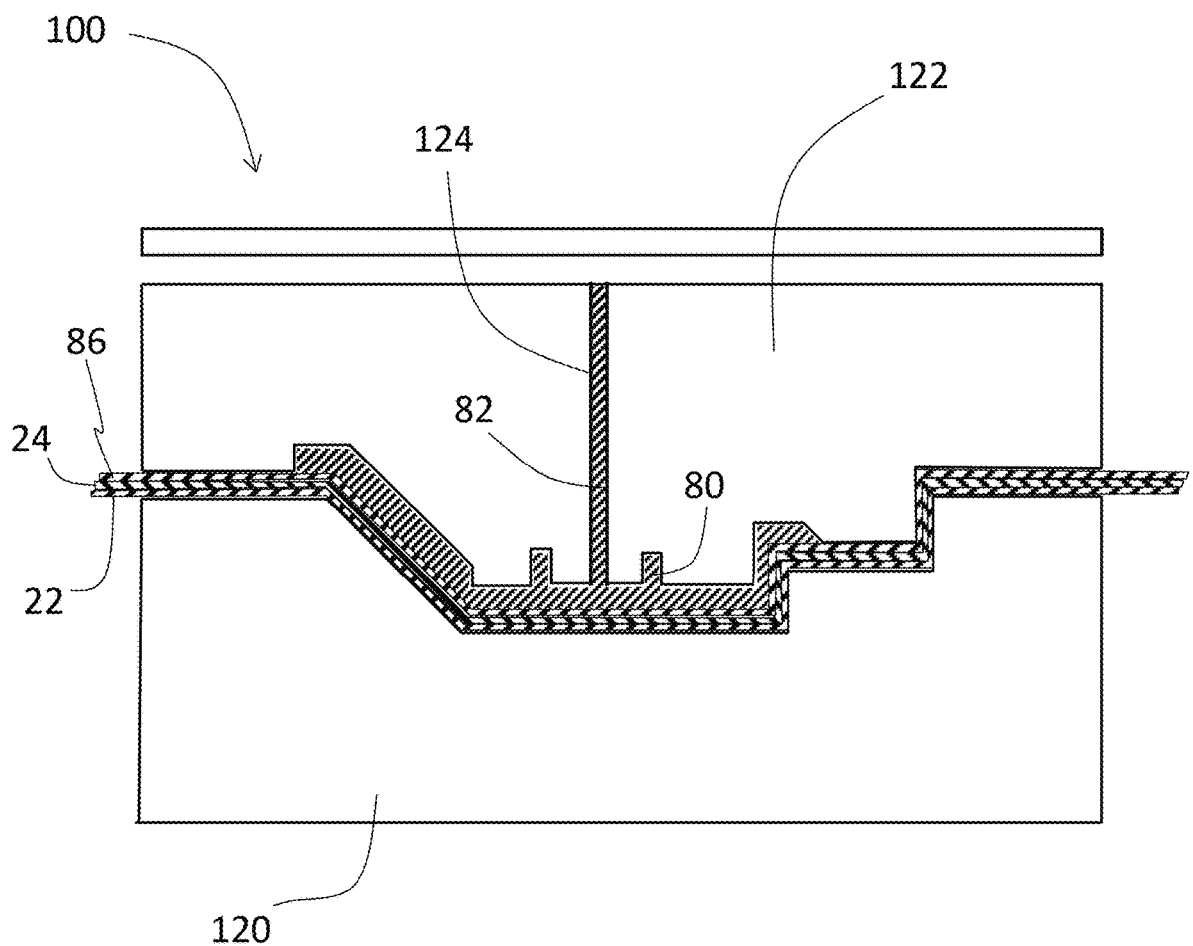

STEP 4 (at DD; FIG. 10*b*)—The thermoform mold tool 100 is closed. The thermoform mold tool 100 will generally comprise a first mold member 120 and a second mold member 122 that together define the cavity 110. It will be appreciated that in certain arrangements, the mold tool 100 may comprise additional mold members.

STEP 5 (at EE; FIG. 10*b*)—Secondary features (generally noted as 80) are now co-injected upon the B-side of the layered construct. The secondary features are formed of a compatible thermoplastic. In the present embodiment, the thermoplastic is a polypropylene that is co-injected via a suitable runner 124 provided on the second mold member 122. As shown, the co-injected polypropylene material, and hence the formed secondary structure, is applied to the B-side of the article. By virtue of the high-pressures required for the injection-molding step of the process, the 2 covering layers 22, 86, NF-PP base 24, and the co-injected polypropylene 82 are urged into contact, therein ensuring a secure bond between these different components of the finished article.

STEP 6 (at FF; FIG. 10*b*)—The thermoform mold tool 100 is maintained closed until a predefined cycle time is achieved. The cycle time will be dependent upon the article being formed, as well as the heating/cooling profile of the mold tool being used.

Figure 10C:
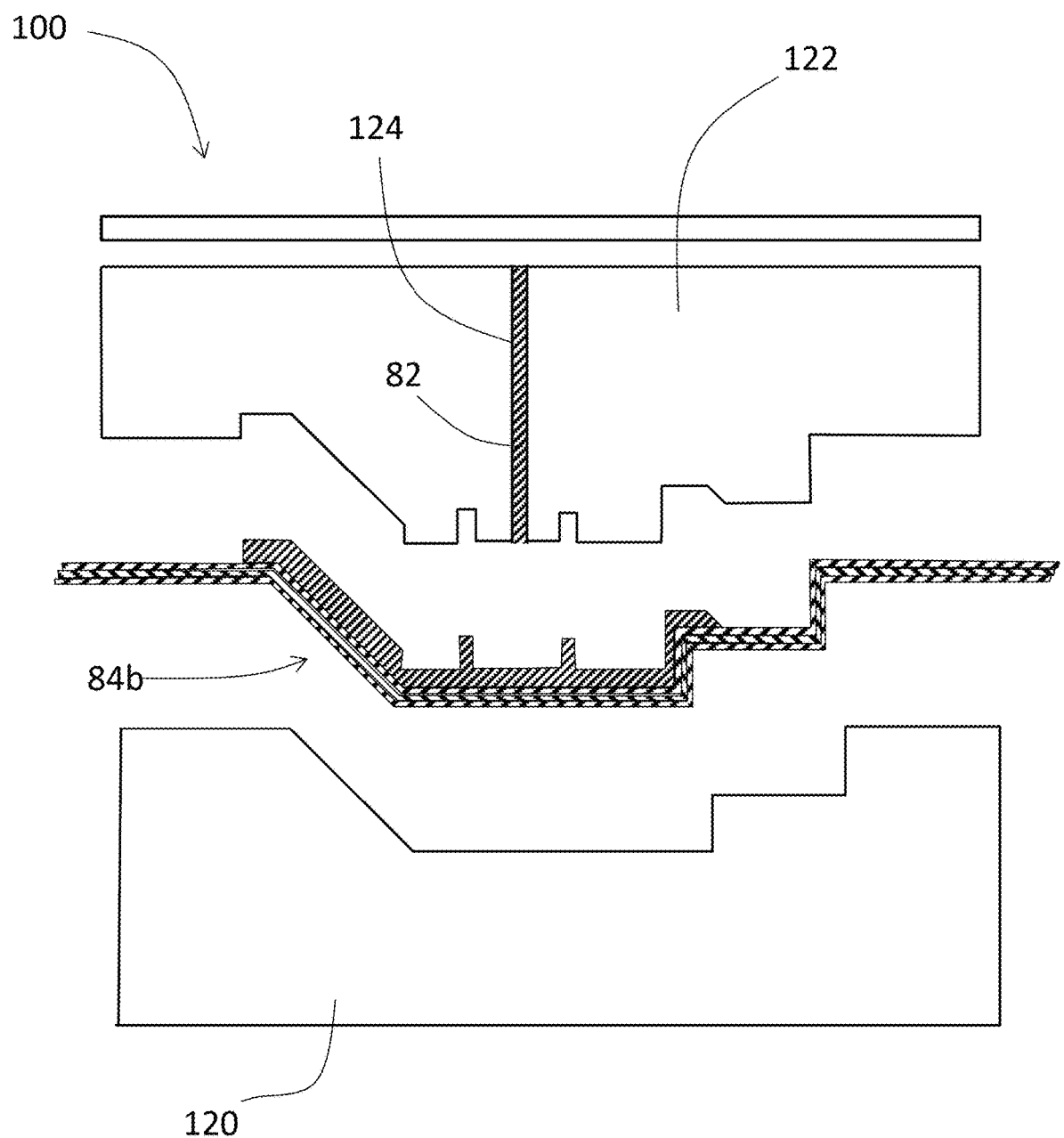

STEP 7 (at GG; FIG. 10*c*)—The thermoform mold tool 100 is opened and the formed article 84*b* is removed. The mold tool may incorporate ejector pins or other mechanisms to facilitate ejection of the molded article (not shown).

STEP 8 (at HH; not shown in Figures)—The formed article 84*b* is subject to post-mold processing, if necessary. Post mold processing may involve the removal of flash or other waste elements from the finished article 84*b*.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A thermoformed automotive interior trim panel comprising:

a self-supporting structural base layer with a decorative covering that is applied to a first side of the base layer and one or more secondary features integrally formed on an opposing second side of the base layer by way of co-injection molding that is simultaneous with the decorative being applied so as to yield a unitary trim panel that is free from recesses and visible fastener heads on the first side; and wherein the one or more secondary features include: i) coupling features selected from a plurality of automotive fasteners and/or a plurality of fastener bosses with a plurality of reinforcement ribs interconnecting the fastener bosses, and ii) a grill having one or more vanes integrally formed in an aperture that extends through the decorative covering and the base layer so that the grill does not require use of fasteners, adhesives, or welding.

2. The thermoformed automotive trim panel according to claim 1, wherein the self-supporting structural base layer is a fiber-reinforced thermoplastic.

3. The thermoformed automotive trim panel according to claim 2, wherein in the fiber-reinforced thermoplastic is a woven or non-woven natural fiber mat that is impregnated and consolidated with polypropylene.

4. The thermoformed automotive trim panel according to claim 3, wherein the woven or non-woven natural fiber mat is comprised of one or more of hemp, jute, sisal, flax and kenaf.

5. The thermoformed automotive trim panel according to claim 1, wherein the decorative covering is selected from a textile fabric, a vinyl and a leather.

6. The thermoformed automotive trim panel according to claim 1, wherein the coupling features include one or more selected from: fastener towers, stand-offs, spacers, and frame members.

7. The thermoformed automotive trim panel according to claim 1, the second side of the base layer includes a frame for receiving an access panel or door.

* * * * *